No. 719,023. PATENTED JAN. 27, 1903.
C. MILLER.
VEHICLE WHEEL.
APPLICATION FILED DEC. 13, 1901.
NO MODEL. 2 SHEETS—SHEET 1.
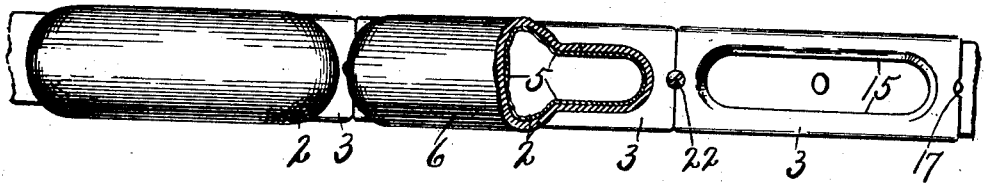
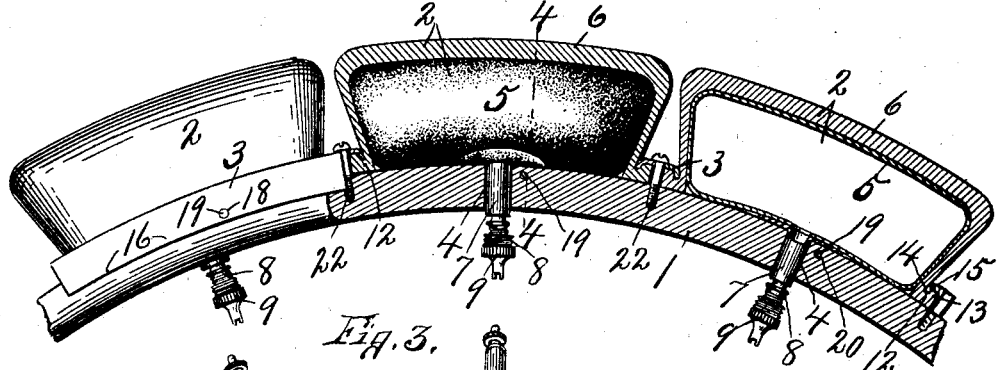
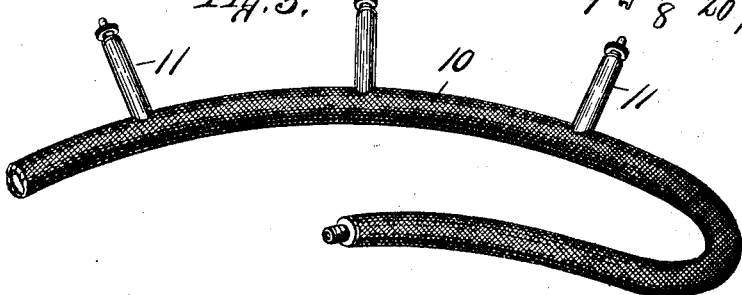
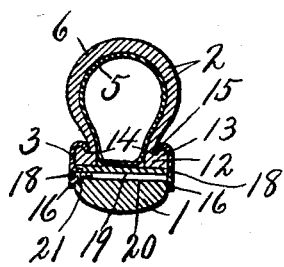
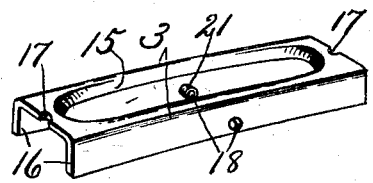
WITNESSES:
INVENTOR
Charles Miller,
BY
Smith & Denison
ATTORNEYS.

No. 719,023. PATENTED JAN. 27, 1903.
C. MILLER.
VEHICLE WHEEL.
APPLICATION FILED DEC. 13, 1901.
NO MODEL.
2 SHEETS—SHEET 2.

WITNESSES:

INVENTOR
Charles Miller,
BY
Smith & Denison
ATTORNEYS.

UNITED STATES PATENT OFFICE.

CHARLES MILLER, OF BINGHAMTON, NEW YORK.

VEHICLE-WHEEL.

SPECIFICATION forming part of Letters Patent No. 719,023, dated January 27, 1903.

Application filed December 13, 1901. Serial No. 85,787. (No model.)

*To all whom it may concern:*

Be it known that I, CHARLES MILLER, of Binghamton, in the county of Broome, in the State of New York, have invented new and useful Improvements in Vehicle-Wheels, of which the following, taken in connection with the accompanying drawings, is a full, clear, and exact description.

This invention relates to improvements in vehicle-wheels, having more particular reference to the rim and the sectional tire secured thereto.

The object of this invention is to provide the rim with a tire composed of a series of separate inflatable sections having no communication one with the other, each being provided with a separate valve whereby the sections may be inflated and held inflated independently of each other.

Another object is to extend the valve of each section through the rim of the wheel and to provide the inlet-passages in which the valves are arranged with suitable removable caps normally closing the inlet-opening, whereby the tire-sections may be inflated independently, or a suitable air-tube having a series of branch nipples corresponding in number to the number of sections may be detachably connected to the inlet-passages for simultaneously inflating all of the sections—as, for instance, when the tire-sections are first inflated.

A further object is to provide each section with an open clamping-frame, which is secured to the rim and in which the intermediate portions of the side bars are prevented from spreading by suitable clamping means, hereinafter described.

To this end the invention consists in the combination, construction, and arrangement of the parts of a vehicle-wheel, as hereinafter fully described, and pointed out in the claims.

Figure 6:
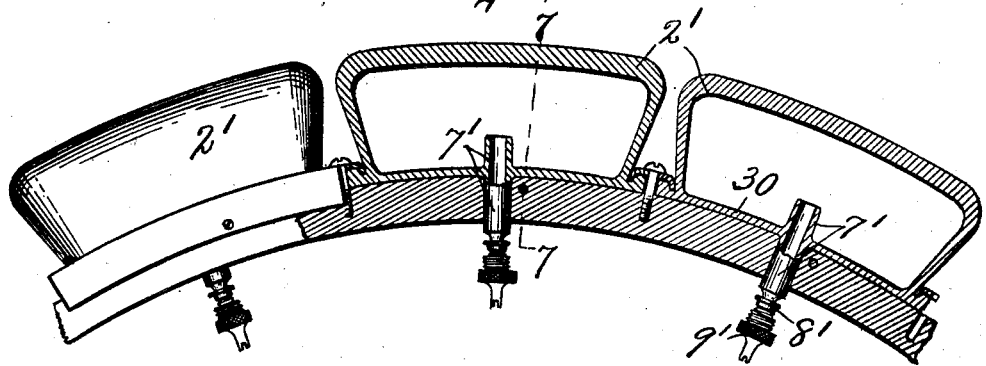
Figure 7:
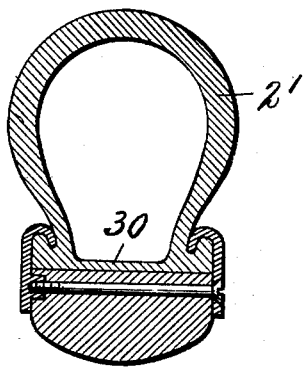

Referring to the drawings, Figure 1 is a top plan, partly in section, of a portion of a rim of a wheel and a series of inflatable sections operatively secured thereto. Fig. 2 is a side elevation, partly in section, of the parts seen in Fig. 1. Fig. 3 is a detail view of a portion of an inflating-tube for simultaneously inflating the sections. Fig. 4 is a sectional view taken on line 4 4, Fig. 2. Fig. 5 is a perspective view of one of the detached open clamping-frames for one of the inflatable sections. Fig. 6 is a sectional view similar to Fig. 2, showing a single closed inflatable section, the inner sack being dispensed with. Fig. 7 is a sectional view taken on line 7 7, Fig. 6.

Similar reference characters indicate corresponding parts in all the views.

In the drawings, Figs. 1 to 5, inclusive, I have shown a portion of a vehicle-wheel consisting of a rim 1, a series of separate inflatable sections 2, and separate clamping-plates 3, holding the tire-sections in position and permitting the removal of either section independently of the others. The rim 1 may be of any desired form, size, or construction, either wood or sheet metal, and is provided with a series of substantially radial apertures 4 for receiving suitable nipples, presently described, which are formed upon the inflatable sections. Each of these inflatable sections 2 preferably consists of an inner sack 5 and an outer casing 6, the inner sack 5 being formed of thin rubber having a hollow nipple 7 extending through the aperture 4 and provided with an inlet-passage communicating with an interior chamber of the sack 5. The nipples of each sack are provided with a valve 8, normally closing the inlet-passage against the deflation of the sack, the casings of these valves being arranged at the inner side of the rim and provided with removable caps or closures 9, which serve to prevent the entrance of dust or dirt to the valve-chamber. These valves may be of any desired construction, and being independent of each other it is apparent that the sacks may be inflated separately.

When the tire-sections are first inflated, I preferably use an air-tube 10, which is provided with a series of nipples 11, adapted to be connected in the usual manner to each of the valve-casings 8, whereby all of the tire-sections may be simultaneously inflated, after which the air-tube 10 may be removed and the caps 9 replaced in position upon the casings 8. Although the air-tube 10 is particularly advantageous in the initial inflation of the tire-sections, it will be readily understood that it forms no permanent part of the wheel and that the essential principle of this invention is to provide for the separate and independent inflation of the sections.

As seen in Figs. 1, 2, and 4, the sack 5 normally rests upon the periphery of the rim, and the nipples 7 extend entirely through the rim in the apertures 4, and that should any one of the sections become deflated from any cause it is simply necessary to remove its cap 9 and to attach any form of air-pump or compressed-air conduit to the casing 8 of the valve for reinflating the section. The outer casing 6 incloses the outer and side walls of the sack 5 and are each provided with a perimetric base-flange 12, resting upon the periphery of the rim and having a marginal rib 13 and a groove 14 at the inner side of the rib. The outer wall of the casing forms the tread of the tire and is usually thicker than the end and side walls, said outer casing being secured in such manner as to be readily removed from the sack without displacing the sack from the rim, or, if desired, the outer section and sack may be removed together by simply removing the individual clamping members for each section.

The clamping-plates 3 preferably consist of open metal frames having lengthwise side bars and transverse end bars uniting the opposite ends of the side bars. Each of these clamping-frames surrounds its respective tire-section and normally engages the flange 12 to impinge the same against the periphery of the rim being provided with inner marginal ribs 15, surrounding the opening in the frame and resting in the groove 14 of the base-flange 12. The rib 13 of the flange 12 being at the outer side of the rib 15 of the frame 3, it is apparent that when the frame is clamped in position the outer section 6 is normally held from spreading or displacement, which also serves to firmly hold the sack in operative position. The longitudinal edges of the open frames 3 are provided with inwardly-projecting flanges 16, and the end edges of the transverse bars are provided with recesses 17, the flanges 16 being extended inwardly beyond the periphery of the rim and lapped upon the side edges thereof and serve to prevent lateral displacement of the clamping-frame. These inwardly-projecting flanges 16 are provided with transverse apertures 18 substantially midway between their opposite ends for receiving a clamping-bolt 19, which is passed through a transverse aperture 20 in the rim at one side of the inflating-nipples for tying the lengthwise side bars of the clamping-frame together to prevent their spreading when the tire-sections are inflated, this clamping-bolt also serving to firmly lock the frame 3 to the rim and also to strengthen the rim from splitting longitudinally owing to the large number and size of openings therein for receiving the several nipples.

One of the flanges 16 of each frame is provided with an inwardly-projecting boss 21, which enters a recess in the adjacent side of the rim 1, said boss having a threaded aperture for receiving a similarly-threaded end of the bolt 19, the opposite end of said bolt being countersunk in the opposite end of said flange, and is slotted for receiving a screwdriver whereby the bolt 19 may be readily removed when it is desired to remove the clamping-plate or the tire-section which is held thereby.

The meeting ends of the several clamping-plates 3 preferably abut against each other and are additionally secured to the rim by clamping-screws 22, which enter the recesses 17 in adjacent ends of the clamping-plates, and it is thus evident that a single screw serves to hold the adjacent ends of the clamping-plates in position.

In the operation of my invention the inner sacks are first placed in position end to end upon the rim, with their nipples 7 and the valves therein projecting through the apertures 4. The outer casings are then slipped over the sacks 5 until the flanges 12 engage the periphery of the rim, and the several clamping-plates are then slipped over the outer casing 6 and side edges of the rim, whereupon the bolts 19 and screws 22 are placed in operative position for locking the frames to the rim. The inflating-tube 10 is then connected to the inlet-openings of the several inflatable sections, which are then inflated in the usual manner, whereupon the tube 10 is removed and the caps 9 placed in position upon the casings 8. Should one of the inflatable sections become deflated, it is simply necessary to remove its bolt 19 and one or both of the screws 22 holding that particular plate in position, whereupon the impaired tire-section may be removed and a new one inserted and inflated individually with but very little loss of time and slight expense.

In Figs. 6 and 7 I have shown a slightly-modified form of my invention consisting of a single closed inflatable section 2', which serves as both the casing and the sack and is substantially the same as the outer casing 6, except that it is provided with an inner wall 30, having a nipple 7', valve 8', and cap 9' similar to the nipple, valve, and cap 7, 8, and 9 of the section 2.

The operation of my invention will now be readily understood upon reference to the foregoing description and the accompanying drawings.

Having thus described my invention, what I claim, and desire to secure by Letters Patent, is—

1. The combination of a rim having a series of radial openings therethrough and provided with a transverse aperture for each radial opening and in proximity thereto, a separate inflatable sack for each opening resting on the rim and having a valved nipple in its respective opening, an inclosing case or tread for each sack having an outwardly-flanged base resting on the rim, an open frame engaging the flanged base and having side flanges embracing the rim, said side flanges having apertures alined with the apertures in the rim, one of said side flanges carrying an inwardly-extending threaded boss projecting into the aperture in the rim, and a bolt passed through said aperture and engaging in said threaded boss, substantially as described.

2. The combination of a vehicle-rim and a plurality of separately-inflatable tire-sections, said sections each having a valved nipple, the rim having a radial opening for each nipple and a transverse aperture at one side of and in proximity to each radial opening, a clamping-frame for each inflatable section, said frame including downwardly-extending marginal ribs, an outer casing for each inflatable section, said outer casing having a flanged boss resting on the rim and engaged by the marginal ribs of the clamping-frame, parallel side flanges carried by said frame and provided with apertures alining with the transverse apertures in the rim, a threaded boss carried by one of the side flanges and projecting into the rim, and a clamping-bolt for each frame passed through its aperture in the rim and engaging in said threaded boss.

3. The combination of a vehicle-rim having a series of radial openings and a second series of transverse openings, one for each radial opening, inflatable tire-sections and casings therefor, one section for each set of radial and transverse openings and having a valved nipple extending through its corresponding radial opening, and a clamping-frame for each section, said frame comprising parallel side flanges to embrace the rim and interior depending marginal ribs to impinge the casing on opposite sides thereof, and securing means passed through the side flanges and transverse openings in the rim to lock the frames to the rim, substantially as described.

In witness whereof I have hereunto set my hand this 30th day of November, 1901.

CHARLES MILLER.

Witnesses:
H. E. CHASE,
MILDRED M. NOTT.